(12) United States Patent
Auclair et al.

(10) Patent No.: US 7,543,486 B2
(45) Date of Patent: Jun. 9, 2009

(54) METHOD OF ESTIMATING THE DURATION OF TARGET WHEEL TEETH

(75) Inventors: Dominique Auclair, Villiers-sur-Marne (FR); Olivier Lejeune, Beynes (FR); Olivier Masson, Rueil-Malmaison (FR)

(73) Assignee: IFP, Rueil-Malmaison (FR)

( * ) Notice: Subject to any disclaimer, the term of this patent is extended or adjusted under 35 U.S.C. 154(b) by 0 days.

(21) Appl. No.: 11/960,817

(22) Filed: Dec. 20, 2007

(65) Prior Publication Data

US 2008/0156085 A1    Jul. 3, 2008

(30) Foreign Application Priority Data

Dec. 22, 2006    (FR) .................................. 06 11410

(51) Int. Cl.
*G01M 15/04*    (2006.01)

(52) U.S. Cl. .................. 73/114.77; 73/114.26; 702/147

(58) Field of Classification Search .................. 73/1.37, 73/114.26, 114.77, 488, 494; 702/145, 147
See application file for complete search history.

(56) References Cited

U.S. PATENT DOCUMENTS

| | | | | |
|---|---|---|---|---|
| 3,991,727 | A * | 11/1976 | Kawai et al. ................. | 123/478 |
| 4,292,670 | A * | 9/1981 | Reid et al. ................... | 701/118 |
| 4,305,072 | A * | 12/1981 | Makita .................. | 340/870.31 |
| 4,553,426 | A * | 11/1985 | Capurka .................. | 73/114.26 |
| 4,779,214 | A * | 10/1988 | Kinugasa ..................... | 702/147 |
| 5,386,810 | A | 2/1995 | Gronenberg et al. | |

(Continued)

FOREIGN PATENT DOCUMENTS

DE    101 54 155 A1    5/2003

(Continued)

*Primary Examiner*—Harshad Patel
*Assistant Examiner*—Freddie Kirkland, III
(74) *Attorney, Agent, or Firm*—Antonelli, Terry, Stout & Kraus, LLP.

(57) ABSTRACT

A method for determining as a function of time the angle of rotation of a crankshaft by estimating the position of missing teeth on a target wheel is disclosed which has application to engine control. A sensor acquires, as a function of time, a periodic signal comprising a pulsating waveform, each pulse indicating the passage of a tooth past this sensor. The position of a missing pulse on the signal is estimated from a missing tooth on the target wheel, by: estimating, during a cycle N, a time interval S between the passage past the sensor of a tooth $d_p$ preceding the missing tooth d and the passage past the sensor of a tooth $d_s$ following missing tooth d, by means of the time interval between the passages of the same teeth during the previous cycle N−1 then, estimating the position of the missing pulse in this interval S, according to the position of the pulses in time interval A between the passage past the sensor of tooth $d_s$−r and the passage past the sensor of tooth $d_s$−r during cycle N, with $$r = \frac{lj}{2k}$$

the engine being a j-stroke (2 or 4) engine and comprising k cylinders and a target wheel with l teeth, including the missing tooth; finally, determining as a function of time the crankshaft rotation angle by the modified signal.

4 Claims, 4 Drawing Sheets

U.S. PATENT DOCUMENTS

| | | | |
|---|---|---|---|
| 5,537,322 A * | 7/1996 | Denz et al. | 701/110 |
| 5,663,495 A * | 9/1997 | Allen et al. | 73/114.26 |
| 5,671,145 A * | 9/1997 | Krebs et al. | 701/102 |
| 5,757,875 A * | 5/1998 | Ramseyer et al. | 377/3 |
| 6,334,094 B1 * | 12/2001 | Hirakata et al. | 702/145 |
| 6,609,498 B2 * | 8/2003 | Mathews et al. | 123/406.62 |
| 7,069,173 B2 * | 6/2006 | Grant et al. | 702/151 |
| 7,096,136 B2 * | 8/2006 | Bohnig et al. | 702/96 |

FOREIGN PATENT DOCUMENTS

| | | |
|---|---|---|
| EP | 1 424 479 A1 | 6/2004 |
| EP | 1 462 638 | 9/2004 |
| FR | 2 691 207 A1 | 11/2003 |
| FR | 2 860 069 | 3/2005 |
| GB | 2 357 849 A | 7/2001 |

\* cited by examiner

METHOD OF ESTIMATING THE DURATION OF TARGET WHEEL TEETH

BACKGROUND OF THE INVENTION

1. Field of the Invention

The present invention relates to the field of engine control and acquisition of data synchronous with the engine crankshaft, and more particularly the invention relates to the field of angular prediction methods allowing determination of the precise geometric position of the crankshaft and has application to engine control in engine manufacturers' research laboratories to design of automotive engine control systems and can also be integrated into engine control systems in a vehicle.

2. Description of the Prior Art

During the operating cycle of an internal-combustion engine, many actions can be synchronized with the geometric position of the crankshaft. This is the case for fuel injection control, spark plug control and distribution devices management. Similarly, during the research phase, engineers need to acquire signals in precise angular windows and to measure the instantaneous speed of the engine. For example, it is necessary to know the angular position of the crankshaft and its instantaneous speed within the context of control systems allowing optimizing the operating point of an internal-combustion engine through real-time processing of significant operating parameters such as the pressure prevailing in the various combustion chambers at a series of successive times of each combustion cycle.

To carry out these various actions, an engine is equipped with a calculator system that must have precise information on the crankshaft position. To meet these requirements, the crankshaft is equipped with a toothed wheel and with a sensor that detects the passage of the teeth in order to inform the calculator system managing the various control devices. This toothed wheel is referred to as target wheel.

The target wheel has become a standard. Although it has various characteristics according to manufacturers, its principle remains substantially the same: a target wheel is a toothed wheel secured to the crankshaft, whose teeth distribution and number of teeth are given. An example of a target wheel commonly encountered in Europe is a toothed wheel with 60 teeth evenly spaced out every 6°.

However, to use a target wheel, a tooth numbered 1 having a perfectly known position has to be positioned, that is the precise time when a particular tooth (tooth 1) goes past the sensor has to be determined by means of the signal from the sensor. Thus, to detect the angular position of the crankshaft, the toothed wheel generally comprises 1 or 2 missing teeth that create an absolute reference frame for the position of the crankshaft. In the aforementioned example of a target wheel with 60 consecutive teeth evenly spaced out by 6°, two consecutive teeth are missing. A "58X" type target wheel means a target wheel with "60 teeth minus 2". Detection of the missing teeth provides an absolute reference, thus indicating the precise position of the crankshaft. By definition, tooth 1 is set as the tooth that follows the two missing teeth. FIG. 1 shows the configuration of a "58X" type target wheel denoted by CM.

Target wheels are associated with a sensor intended to detect passage of the teeth. FIG. 1 shows the signal (SB) delivered by such a sensor in the instance of a 58X target wheel. This analog signal has to be conditioned so as to be useful. The result of this conditioning (SC) is shown in FIG. 1. A rising front of signal SC is the reflection of the middle of a tooth. Detection of this rising front is precisely used as a basis by calculator systems for synchronizing engine operation. The first rising front that follows the missing teeth thus indicates the middle of the first tooth (tooth number 1) of the target wheel. The second front naturally corresponds to the second tooth and so on up to the $58^{th}$ tooth. Upon passage of the missing teeth, the sensor is no longer excited until the arrival of tooth 1, which means that, for the duration of the gap, i.e. 18°, the information on the position of the teeth is no longer delivered. What is referred to as the "duration of tooth X" is the time elapsed between the passage past the sensor of tooth x and the passage past the sensor of the next tooth (denoted by x+1). This information break causes several problems for the operating system of this target wheel. In fact, the target wheel allows sequencing of the engine operation with various purposes:

teeth detection allows the operating system to be informed of the geometric position of the engine crankshaft at regular intervals. An 18° information break at the level of the missing teeth can therefore not be eliminated;

measurement of the consecutiveness of the teeth provides essential information to the operating system: the instantaneous speed of the crankshaft every 6°. The operating system can therefore not be left with a break in the measurement of the instant speed over 18° at the level of the missing teeth. FIG. 2 illustrates a measurement of the engine speed (RM) as a function of the crankshaft rotation (RV). Without any correction, it can be observed that the instantaneous speed of the engine is 1500 rpm, except at the level of the missing teeth where the duration of the last ($58^{th}$) tooth corresponds to the sum of the $58^{th}$ tooth, of the $59^{th}$ tooth and of the $60^{th}$ tooth, which amounts to dividing the engine speed by three (500 rpm);

finally, in order to optimize the number of sensors, detection of the missing teeth allows determination of the superscript suffix of the teeth and thus to locate the geometric position of the crankshaft in the revolution. As a complement to information coming from an instrumented sensor on the camshaft, precise knowledge of the geometric position of the crankshaft allows precise positioning of the injection and/or ignition windows for each cylinder.

Thus, although the missing teeth are necessary to identify the first tooth, they cause a break in the arrival of information that sequences engine events such as injection. However, this information is essential for providing further information to the control system every 6°. For example, the control system has to be informed of the instantaneous speed corresponding to a 6°, and not 18°, crankshaft variation, to ensure coherence in the engine speed measurement.

This implies that the position of the two missing teeth (tooth 59 and tooth 60) has to be estimated in order to continue to sequence the control software and to provide coherent measurement of the instantaneous speed. Estimating the position of a tooth means completing the signal coming from the sensor and conditioned (SC) as if the wheel had no missing tooth. The duration of each tooth therefore has to be estimated: the time elapsed between the passage of tooth 58 and tooth 59 (if there was one) past the sensor, and time elapsed between the passage of tooth 59 (estimated) and tooth 60 (if there was one) past the sensor.

Estimation of the position of the missing teeth, that is of the time of passage of the missing teeth past the sensor, conventionally uses a simple interpolation or a rule of three, according to the information on the previous teeth provided by the signal delivered by the sensor and conditioned (SC).

However, this type of estimation is not acceptable for precise engine control and notably for precise determination of the injection periods according to the crankshaft position. FIG. 3 shows the engine speed (RM) as a function of the crankshaft rotation (RV). FIG. 3 is an enlargement of FIG. 2. It can be seen that the engine speed undergoes speed variations referred to as cyclic irregularities. These cyclic irregularities are linked with the various operating phases of the engine and in particular, on the one hand, the compression of the fuel mixture by the piston (crankshaft slowing down) and the explosion of the fuel mixture (crankshaft acceleration) and, on the other hand, the number of engine cylinders whose times of firing are evenly distributed over the engine combustion cycle (example: every 180° for a 4-cylinder 4-stroke engine, every 120° for a 6-cylinder 4-stroke engine). This involves, on the one hand, that the duration of the missing teeth varies from one crankshaft revolution to the next and, on the other hand, that the durations of teeth 58, 59 and 60 are different and follow a variation depending on the cyclic irregularities.

SUMMARY OF THE INVENTION

The invention is a method of estimating the time elapsed between the passage past the sensor of a missing tooth (if it existed physically) of a target wheel and the passage past the sensor of the next tooth, considering the engine cyclic irregularities.

The invention relates to a method allowing determination as a function of time of the angle of rotation of a crankshaft of a j-stroke (2 or 4-stroke) engine comprising k cylinders and a target wheel, the wheel having a disc comprising l teeth numbered from 1 to l, evenly distributed on the periphery of the disc, wherein at least one tooth d, referred to as missing tooth, is removed, and allows determination of a complete revolution of the crankshaft, and wherein a periodic signal comprising pulses is acquired as a function of time by a sensor associated with the target wheel, each pulse indicating the passage of a tooth past the sensor. The method comprises the following stages:

a) estimating the position of a missing pulse on the signal corresponding to the missing tooth d during a cycle N of the engine, by carrying out the following stages:

estimating, during cycle N, a time interval S between the passage past the sensor of a tooth $d_p$ preceding the missing tooth d and the passage past the sensor of a tooth $d_s$ following the missing tooth d, by means of the time interval between the passages of the same teeth during the previous cycle N−1;

estimating the position of the missing pulse in the time interval S, according to the position of the pulses in time interval A between the passage past the sensor of tooth $d_p$−r and the passage past the sensor of tooth $d_s$−r during cycle N, with $$r = \frac{lj}{2k};$$

b) determining as a function of time the crankshaft rotation angle by means of the thus modified signal.

According to the invention, the position of the missing pulse corresponding to missing tooth d can be estimated by carrying out the following stages:

measuring by means of the sensor time interval S between tooth d−2 and tooth d+2 during cycle N−1;

estimating time interval A between tooth d−2 and tooth d+2 during cycle N, by means of the measurement of the time interval between the corresponding teeth for the previous cylinder, that is tooth d−2−r and tooth d+2−r during cycle N, with $$r = \frac{l \cdot j}{2 \cdot k}$$

estimating the duration of tooth d−2 during cycle N by weighting by ratio S/A the measurement of the duration of tooth d−2−r, estimating the duration of tooth d−1 during cycle N by weighting by ratio S/A the measurement of the duration of tooth d−1−r, and determining the position of the pulse according to the measured position of the pulse corresponding to tooth d−2, and the estimated durations of teeth d−2 and d−1.

According to the invention, the duration of missing tooth d can also be estimated in order to reliably determine the position of the pulse corresponding to tooth d+1. It is also possible to estimate an uncertainty on the estimation of the positions of the pulses corresponding to teeth d−1, d and d+1, by also determining the duration of tooth d+1, and by comparing the measured time interval between the passage past the sensor of tooth d−2 and the passage past the sensor of tooth d+2 and a corresponding estimated time interval obtained from said duration estimations.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION

In order to determine as a function of time the angle of rotation of the crankshaft of an engine, it is necessary to measure both the number of revolutions, that is information is given on the angular position of the crankshaft every 360°, and the passage of teeth of a target wheel past a sensor. If these teeth are evenly distributed on the periphery of the wheel, every 6° for example, a time information indicating the angle of rotation of a crankshaft every 6° is obtained. A periodic signal comprising pulses, each pulse indicating the passage of a tooth past the sensor, is therefore acquired as a function of time by means of the sensor associated with the target wheel.

However, in order to obtain information on the number of revolutions, at least one tooth d, referred to as missing tooth and allowing determination of a complete revolution of the crankshaft, is removed. To continue providing information every 6°, this missing tooth is reconstructed, that is the position of a missing pulse on the signal is estimated. This missing crenel corresponds to missing tooth d: it is the pulse that should be provided by the sensor if the tooth had not been removed.

The present invention is described within the context of a four-stroke engine comprising six cylinders and a 58X target wheel, that is one wants to estimate the position of two consecutive missing teeth, referred to as "tooth 59" and "tooth 60". The method is however totally independent of the engine type and of the target wheel type.

Figure 4:
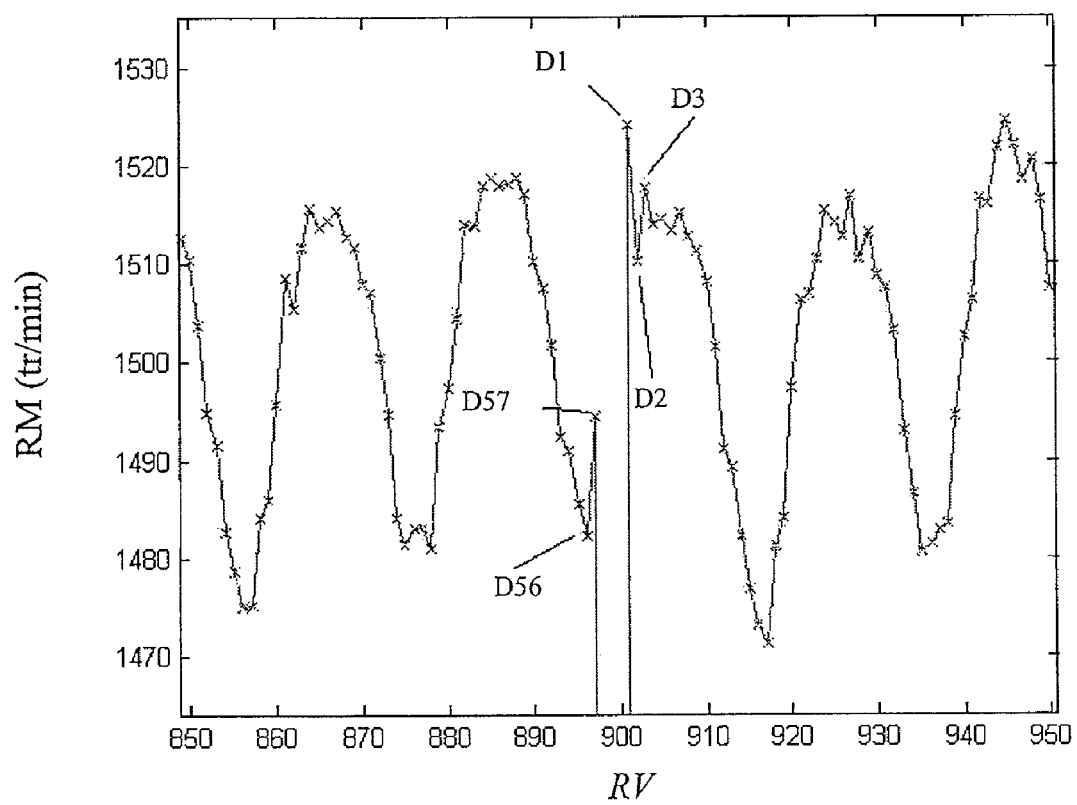
FIG. 4 shows a curve of the instantaneous speed (RM) as a function of the crankshaft rotation (RV) determined from information provided by the target wheel.

When analyzing the measurements given by a sensor positioned on a four-stroke six-cylinder engine, it can be observed that the teeth adjacent to the missing teeth are disturbed and deform the curve of the instant speed (RM) as a function of the crankshaft rotation (RV) determined from the information obtained from the target wheel, as illustrated in FIG. 4, where D56, . . . D3 respectively represent teeth 56 and 3. This is linked with the nature of the sensor and with its conditioning system. Measurement of the position of tooth 58 and of tooth 1 therefore gives distorted results. Although the error is slight (of the order of 1%), it gives a measurement that cannot correspond with the physical operation of the engine, but what is most inconvenient is that it disturbs the reconstruction of missing teeth 59 and 60.

According to the invention, in order to overcome this problem, the method reconstructs four teeth (teeth 58, 59, 60, 1) instead of two (59 and 60). Reconstructing a tooth positions a pulse on signal SC at a position corresponding to the time when the tooth would go past the sensor if it existed physically. Estimating the temporal position on signal SC of a tooth amounts to estimating the time interval of the previous tooth, that is its duration. Thus, in order to estimate the position of teeth 58, 59, 60 and 1, it is necessary to estimate the respective durations of teeth 57, 58, 59 and 60.

Figure 1:
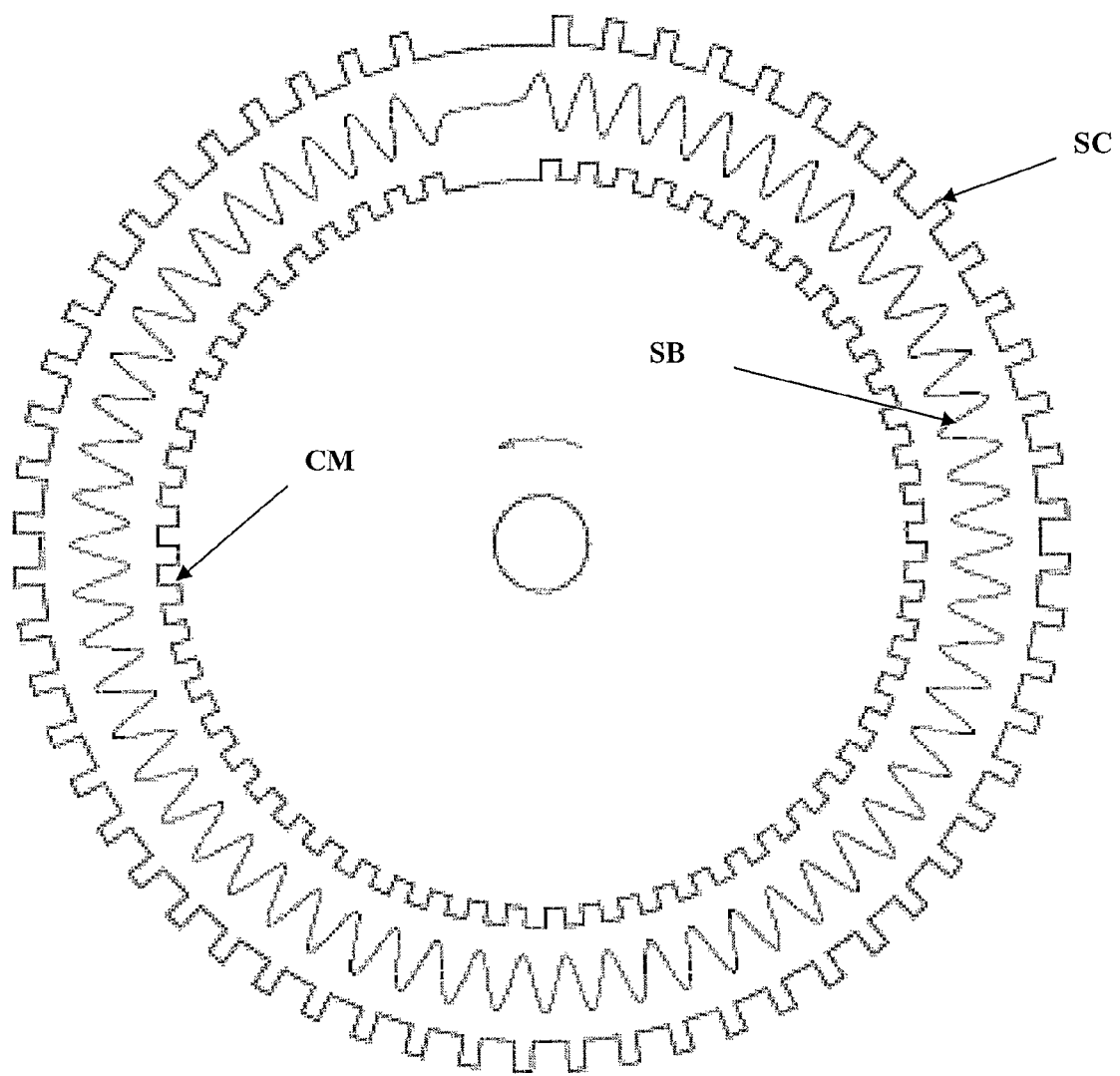
FIG. 1 shows the configuration of a "58X" type target wheel denoted by CM, the analog signal (SB) delivered by the associated sensor and the conditional analog signal (SC)
Figure 2:
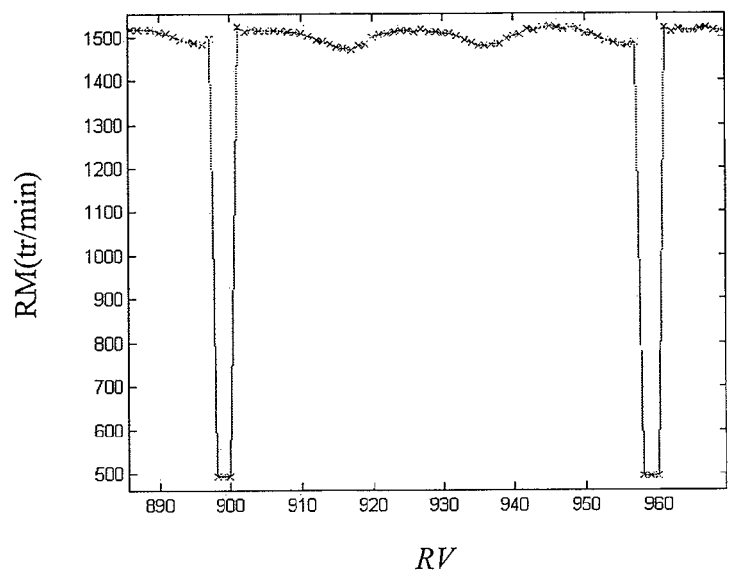
FIG. 2 illustrates a measurement of the engine speed (RM) as a function of the crankshaft rotation (RV)
Figure 3:
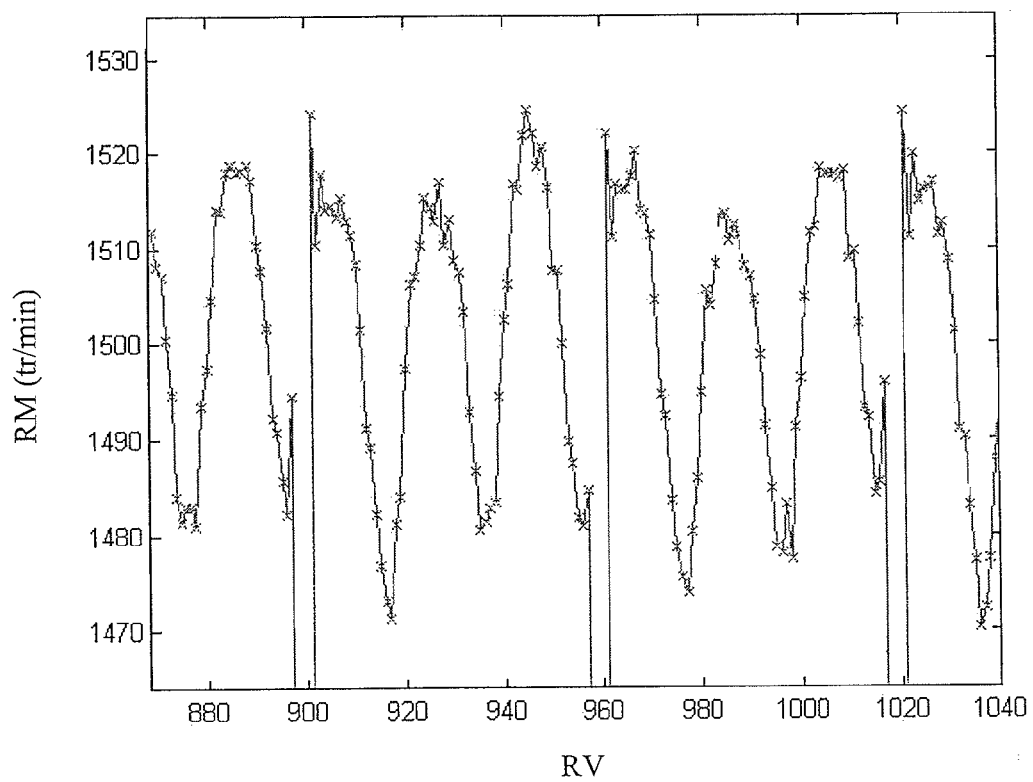
FIG. 3 shows the engine speed (RM) as a function of the crankshaft rotation (RV) which is an enlargement of FIG. 2.

As illustrated by FIG. 3, it is necessary, in order to carry out a precise estimation of the durations of the teeth, to account for the engine cyclic irregularities. These cyclic irregularities depend on the number of cylinders, on the engine speed, on the engine load and on the engine balance.

According to the invention, in order to account for the engine cyclic irregularities, the method estimates the position of the four teeth by analyzing the duration of the teeth of the previous crankshaft revolution.

The following notations are adopted to facilitate the description of the example:

$T_{xx\_N}^m$: corresponds to the measured duration of tooth x of the engine cycle in progress, denoted by N. It thus is the time elapsed between the passage past the sensor of tooth x and the passage past the sensor of tooth x+1. Superscript m indicates that this duration is measured by means of the sensor.

$T_{xx\_N-1}^m$: corresponds to the measured duration of tooth x of the previous engine cycle denoted by N−1.

$T_{58\_N}^m$: corresponds to the measured duration of tooth 58 of the engine cycle in progress. This duration corresponds to the sum of the durations of teeth 58, 59 and 60 of cycle N. It thus is the time elapsed between the passage past the sensor of tooth 58 and the passage past the sensor of tooth 1. In fact, teeth 59 and 60 are non-existent on a 58X type target wheel.

$T_{58\_N-1}^m$: corresponds to the measured duration of tooth 58 of engine cycle N−1.

$T_{xx\_N}^e$: corresponds to the estimation of the duration of tooth x during cycle N. Superscript e indicates that this duration is estimated by means of the method. It thus is a calculated value corresponding to the estimated elapsed time between the passage past the sensor of the (physical or virtual) tooth x and the passage past the sensor of the (physical or virtual) tooth x+1.

Upon passage of the teeth past the sensor, the time elapsed since the passage of the previous tooth is recorded. At the rate of 58 teeth per revolution, this represents 58 time measurements per revolution ($T_{1\_N}^m$ to $T_{57\_N}^m$ and $T_{58\_N}^m$), i.e. 116 measurements per engine cycle (for a four-stroke engine).

When the duration of teeth 57, 58, 59 and 60 is to be estimated during the cycle N in progress, the temporal measurements of the previous cycle can be used.

The estimation according to the invention of the four teeth durations is based on two principles:

1—Estimation of the Total Duration of the Five Teeth 57, 58, 59, 60 and 1

The total duration of the five teeth 57, 58, 59, 60 and 1, that is the time elapsed between the passage past the sensor of physical tooth 57 and the passage past the sensor of physical tooth 2, is first estimated. This estimation of the sum of the durations of the five teeth can be obtained by the sum of the measurements of the durations corresponding to the previous cycle N−1:

$$\sum_{i=57}^{60} T_{i\_N}^e + T_{1\_N}^m \approx T_{57\_N-1}^m + T_{58\_N-1}^m + T_{1\_N-1}^m = S$$

However, if the sum of times $T_{57\_N-1}^m$, $T_{58\_N-1}^m$ and $T_{1\_N-1}^m$ gives approximation of the sum of times $T_{57\_N}^e$, $T_{58\_N}^e$, $T_{59\_N}^e$, $T_{60\_N}^e$ and $T_{1\_N}^m$, this sum remains to be distributed in such a way that the cyclic irregularities of the engine are respected.

2—Distribution of the Durations of the Four Teeth 57 to 60 According to the Cyclic Irregularities Reading an instantaneous speed (VI) survey allows observation that the cyclic irregularities of a four-stroke engine comprising six cylinders follow a pattern that is repeated 6 times per cycle. Thus, in a six-cylinder engine, the pattern (ascent and descent of the instantaneous speed curve) reoccurs every 120 crank angle degrees, that is every 20 teeth, knowing that the gap between two teeth is 6 degrees on a 58X target wheel.

Thus, by means of the previous measurements from a single revolution, the engine cyclic irregularities can be estimated so as to properly distribute the duration of the teeth: observation of the measurements of $T_{37\_N}^m$, $T_{38\_N}^m$, $T_{39\_N}^m$, $T_{40\_N}^m$ and $T_{41\_N}^m$ gives an accurate picture of what engine cyclic irregularities should be to estimate the respective durations of teeth 57 to 60 ($T_{57\_N}^e$, $T_{58\_N}^e$, $T_{59\_N}^e$, $T_{60\_N}^e$).

It is also possible, with the same principle, to estimate the duration of tooth 1: $T_{1\_N}^e$. By means of this information, it is then possible to estimate the time elapsed between the passage past the sensor of tooth 57 and the passage past the sensor of tooth 2. This time interval can then be compared with the measured corresponding time, which gives an indication on the estimation uncertainty.

Putting the above elements in an equation and simplifying them gives the following result for a six-cylinder engine:

$$T_{57\_N}^e = \frac{T_{37\_N}^m * S}{A}$$

-continued $$T^e_{58\_N} = \frac{T^m_{38\_N} * S}{A}$$

$$T^e_{59\_N} = \frac{T^m_{39\_N} * S}{A}$$

$$T^e_{60\_N} = \frac{T^m_{40\_N} * S}{A}$$

$$T^e_{1\_N} = \frac{T^m_{41\_N} * S}{A}$$

with:

$S = T^m_{57\_N-1} + T^m_{58\_N-1} + T^m_{1\_N-1}$ : total duration estimation term $A = T^m_{37\_N} + T^m_{38\_N} + T^m_{39\_N} + T^m_{40\_N}$ : cyclic irregularity estimation term.

Generalization of the method to all engine types and all target wheel types can thus be described. The reconstruction of a missing tooth must account for the engine type to which the method is to be applied. Let there be a j-stroke engine comprising k cylinders and a target wheel having l teeth, with at least one missing tooth. The following stages are carried out to estimate the position of a missing crenel on the signal corresponding to the missing tooth d during cycle N:

- estimating, during cycle N, a time interval S between the passage past the sensor of a tooth $d_p$ preceding the missing tooth d and the passage past the sensor of a tooth $d_s$ following missing tooth d by means of the time interval between the passages of the same teeth during the previous cycle N−1; and
- estimating the position of the missing pulse in time interval S, according to the position of the crenels in time interval A between the passage past the sensor of tooth $d_p$−r and the passage past the sensor of tooth $d_s$−r during cycle N, with $$r = \frac{lj}{2k}.$$

According to the particular embodiment of the invention where the teeth adjacent to the missing tooth are also reconstructed, the stages become:

- determining a total duration between tooth d−2 and tooth d+1 from the following measurements: $T^m_{(d-2)\_N-1}$, $T^m_{(d-1)\_N-1}$, $T^m_{(d+1)\_N-1}$. A total duration estimation term S is deduced therefrom:

$$S = T^m_{(d-2)\_N-1} + T^m_{(d-1)\_N-1} + T^m_{(d+1)\_N-1}.$$

- estimating the engine cyclic irregularities by means of the following measurements: $T^m_{(d-2)-r\_N}$, $T^m_{(d-1)-r\_N}$, $T^m_{d-r\_N}$, $T^m_{(d+1)-r\_N}$. A term A relative to the cyclic irregularities is deduced therefrom:

$$A = T^m_{(d-2)-r\_N} + T^m_{(d-1)-r\_N} + T^m_{d-r\_N} + T^m_{(d+1)-r\_N}$$

with:

$$r = \frac{l}{k/j/2} = \frac{lj}{2k}$$

- estimating at least the following durations, from which the position of the missing tooth is determined: $T^e_{(d-2)\_N}$, $T^e_{(d-1)\_N}$, $T^e_{d\_N}$. The estimated duration $T^e_{(d-1)\_N}$ allows tooth d to be perfectly positioned in relation to tooth d−1, and tooth d−1 is correctly positioned, that is it does not depend on the distortion of signal SC, thanks to duration $T^e_{(d-2)\_N}$. Duration $T^e_{d\_N}$ allows tooth d+1 to be correctly positioned, which allows, if the latter is physical, to evaluate an uncertainty on the estimation.

Ratio S/A represents the measured time interval between tooth d−2 and tooth d+2 during cycle N−1, divided by the estimated time interval between tooth d−2 and tooth d+2 during cycle N. The latter estimation is performed by means of the measurement of the time interval between the corresponding teeth for the previous cylinder, that is tooth d−2−r and tooth d+2−r during cycle N, still with $$r = \frac{lj}{2k}.$$

This ratio S/A allows weighting of the observation made during the cycle in progress:

$$T^e_{d\_N} = \frac{T^m_{d\_N} * S}{A}.$$

Thus, for a four-stroke engine comprising 4 cylinders and a 58X target wheel, the cyclic irregularities follow a pattern that is repeated 4 times per cycle, every 180 degrees, that is every 30 teeth. The estimation of the durations for the four teeth is then written as follows:

$$T^e_{57\_N} = \frac{T^m_{27\_N} * S}{A'}$$

$$T^e_{58\_N} = \frac{T^m_{28\_N} * S}{A'}$$

$$T^e_{59\_N} = \frac{T^m_{29\_N} * S}{A'}$$

$$T^e_{60\_N} = \frac{T^m_{30\_N} * S}{A'}$$

$$T^e_{1\_N} = \frac{T^m_{31\_N} * S}{A'}$$

with:

$S = S^m_{57\_N-1} + T^m_{58\_N-1} + T^m_{1\_N-1}$ : total duration estimation term $A = T^m_{27\_N} + T^m_{28\_N} + T^m_{29\_N} + T^m_{30\_N}$ : cyclic irregularity estimation term.

Example of Application of the Estimation Method

In order to illustrate the benefits provided by the method, two estimations of the position of missing teeth are performed. One, case No. 1, without estimating the position of the adjacent teeth, and the other, case No. 2, using the method according to the invention.

Figures 5A, 5B:
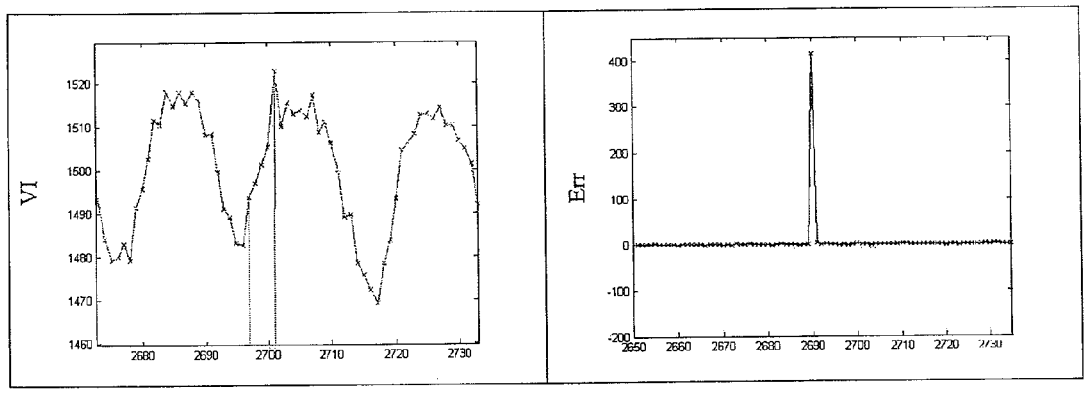
FIG. 5A illustrates the instant speed (VI) every 6 crank angle degrees.
FIG. 5B shows the error (Err) made by a missing teeth estimation.

In case No. 1 (FIGS. 5A and 5B), the durations of teeth 58, 59 and 60 are estimated while disregarding the durations of teeth 57 and 1. FIG. 5A illustrates the instant speed (VI) every 6 crank angle degrees. FIG. 5B shows the error (Err) made in the estimation.

Figures 6A, 6B:
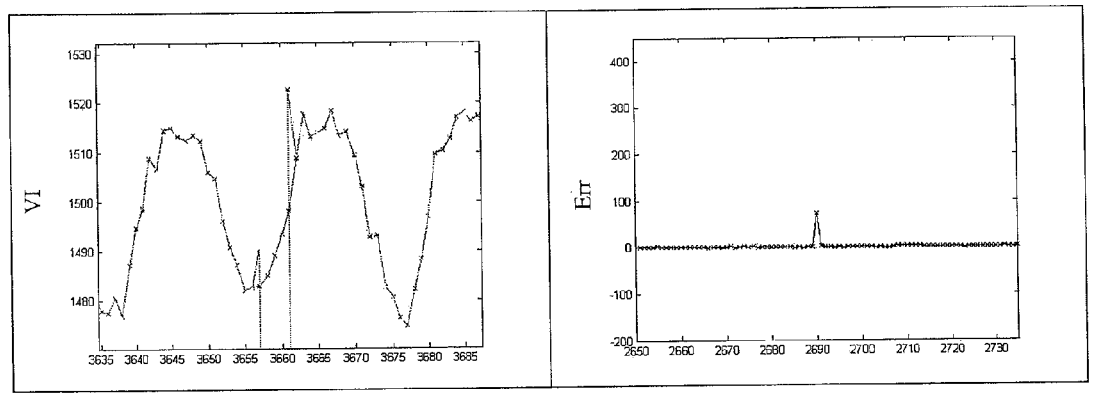
FIG. 6A illustrates the instantaneous speed (VI) every 6 crank angle degrees.
FIG. 6B shows the error (Err) made by the missing teeth estimation according to the invention.

In case No. 2 (FIGS. 6A and 6B), the durations of teeth 58, 59 and 60, as well as teeth 57 and 1, are estimated. FIG. 6A illustrates the instantaneous speed (VI) every 6 crank angle degrees. FIG. 6B shows the error (Err) made in the estimation.

Analysis of the estimation error shows a difference of a factor four between cases No. 1 and 2.

The method thus allows reconstruction of a signal delivered by the sensor linked with the target wheel, so that the information provided by the target wheel continuously indicates the angular position of the crankshaft. The angle of rotation of the crankshaft can be determined as a function of time from this signal with a precision linked with the number of teeth on the target wheel (within about 60 for a 58X target wheel).

The invention claimed is:

1. A method for determination as a function of time an angle of rotation of a crankshaft of a j-stroke engine comprising k cylinders and a target wheel, the wheel including a disc comprising l teeth numbered from 1 to l, evenly distributed on a periphery of the disc, wherein at least one missing tooth d, which has been removed, allows determination of a complete revolution of the crankshaft, and wherein a periodic signal comprising pulses is acquired as a function of time by a sensor associated with the target wheel, each pulse indicating the passage of a tooth past the sensor, comprising:

a) estimating the position of a missing pulse on the signal corresponding to the at least one missing tooth d during a cycle N of the engine, by estimating, during cycle N, a time interval S between passage past the sensor of a tooth $d_p$ preceding the missing tooth d and the passage past the sensor of a tooth $d_s$ following the missing tooth d, by means of a time interval between passage of identical teeth during a previous cycle N−1 and estimating a position of the missing pulse in the time interval S, according to the position of the pulses in time interval A between passage past the sensor of tooth $d_p$−r and the passage past the sensor of tooth $d_s$−r during cycle N, with $$r = \frac{lj}{2k};$$

and b) determining as a function of time a crankshaft rotation angle by means of the estimated position.

2. A method as claimed in claim 1, wherein the position of the missing pulse corresponding to the missing tooth d is estimated by steps comprising:

measuring by means of the sensor time interval S between tooth d−2 and tooth d+2 during cycle N−1;

estimating time interval A between tooth d−2 and tooth d+2 during cycle N, by means of the measurement of time interval between corresponding teeth for a previous cylinder, comprising tooth d−2−r and tooth d+2−r during cycle N, with $$r = \frac{lj}{2k};$$

estimating a duration of tooth d−2 during cycle N by weighting by ratio S/A a measurement of duration of tooth d−2−r;

estimating a duration of tooth d−1 during cycle N by weighting by ratio S/A measurement of the duration of tooth d−1−r; and determining a position of the crenel according to a measured position of a pulse corresponding to tooth d−2 and estimated durations of teeth d−2 and d−1.

3. A method as claimed in claim 2, wherein the duration of missing tooth d is also estimated to determine a position of the pulse corresponding to tooth d+1.

4. A method as claimed in claim 3, wherein an uncertainty on estimation of positions of the pulses corresponding to teeth d−1, d and d+1 is estimated by also determining a duration of tooth d+1, and by comparing a measured time interval between passage past the sensor of tooth d−2 and passage past the sensor of tooth d+2 and a corresponding estimated time interval obtained from the duration estimations.

* * * * *